United States Patent [19]
Ahmadi et al.

[11] Patent Number: 5,311,513
[45] Date of Patent: May 10, 1994

[54] RATE-BASED CONGESTION CONTROL IN PACKET COMMUNICATIONS NETWORKS

[75] Inventors: Hamid Ahmadi, Somers, N.Y.; Jeffrey, H. Derby, Chapel Hill, N.C.; Roch Guérin, Yorktown Heights, N.Y.; Levent Gün, Durham; Gerald A. Marin, Chapel Hill, both of N.C.; Mahmoud Naghshineh, Fishkill; Khosrow Sohraby, Mahopac, both of N.Y.

[73] Assignee: International Business Machines Corp., Armonk, N.Y.

[21] Appl. No.: 943,097

[22] Filed: Sep. 10, 1992

[51] Int. Cl.$^5$ .............................................. H04L 12/56
[52] U.S. Cl. .................................. 370/85.4; 370/85.6; 370/94.1
[58] Field of Search ................. 370/60, 85.4, 85.6, 370/94.1, 110.1; 340/825.51; 371/69.1

[56] References Cited

U.S. PATENT DOCUMENTS

| | | | |
|---|---|---|---|
| 4,827,411 | 5/1989 | Arrowood et al. | 364/300 |
| 5,119,374 | 6/1992 | Firoozmand et al. | 370/85.4 |
| 5,155,725 | 10/1992 | Khalil | 370/85.6 |
| 5,208,805 | 5/1993 | Ochiai | 370/60 |

OTHER PUBLICATIONS

M. Sidi, W-Z. Liu and I. Gopal, "Congestion Control Through Input Rate Regulation," *Proceedings of GLOBECOM '89*, pp. 49.2.1–49.2.5, Dallas, Tex., 1989.

G. Niestegge, "The 'Leaky Bucket' Policing Method in the ATM (Asynchronous Transfer Mode) Network," *International Journal of Digital and Analog Communications Systems*, vol. 3, pp. 187–197, 1990.

K. Bala, I. Cidon and K. Sohraby, "Congestion Control for High Speed Packet Switched Networks," *Proceedings of INFOCOM '90*, San Francisco, Calif., 1990.

Primary Examiner—Benedict V. Safourek
Attorney, Agent, or Firm—Gerald R. Woods

[57] ABSTRACT

A congestion control system for packet communications networks in which access to the network is controlled to prevent such congestion. Packets within the prespecified statistical description of each packet source are marked as high priority ("green" packets) while packets exceeding the pre-specified characteristics are marked with a lower priority ("red" packets). The overall red packet rate is limited to prevent red packet saturation of the network. Packets are marked red for a continuous train of successive red packets. The introduction of red packets into the network is subjected to a degree of hysteresis to provide better interaction with higher layer error recovery protocols. The amount of hysteresis introduced into the red packet marking can be fixed or varied, depending on the statistics of the incoming data packets at the entry point to the network.

15 Claims, 6 Drawing Sheets

LEAKY BUCKET ACCESS CONTROL
WITH STATIC HYSTERESIS

COMMUNICATIONS NETWORK

TYPICAL PACKET DECISON POINT

LEAKY BUCKET ACCESS CONTROL
WITH STATIC HYSTERESIS

LEAKY BUCKET ACCESS CONTROL WITH DYNAMIC HYSTERESIS

RATE-BASED CONGESTION CONTROL IN PACKET COMMUNICATIONS NETWORKS

TECHNICAL FIELD

This invention relates to packet communications networks and, more particularly, to the control of user access to the network in order to minimize congestion in such networks.

BACKGROUND OF THE INVENTION

In high-speed packet switching networks, several classes of traffic share the common resources of the network. Multimedia services such as text, image, voice and video generate traffic at widely varying rates. The traffic characteristics of such different sources, moreover, vary dramatically over time. The transport network must nevertheless guarantee a bandwidth and a quality of service to each connection regardless of these differences. Managing the available bandwidth to avoid congestion and to provide such guaranteed Grades of Service (GOS) for connections with potentially dramatic differences in their statistical behavior is therefore of extreme importance in such networks. For example, while data traffic can usually be slowed down in order to cope with network congestion, real time traffic, such as voice, video or image, has an intrinsic rate determined by external factors; the ability to slow down such sources is usually very limited. Real time traffic therefore requires some level of guaranteed service and hence the allocation of resources for such connections is mandatory. The traffic must be managed, not only to guarantee the availability of resources such as link bandwidth, buffer space, switch capacity, processing resources, and so forth, but also to allocate these resources among the contending traffic streams in a "fair" manner. Network resources are finite, valuable and must be utilized in an optimal manner.

Conventional mechanisms for controlling congestion in a network rely on end-to-end control messages for regulating the flow of traffic. In high speed networks, however, the propagation delays across the network typically dominate the switching and queuing delays. The congestion control feedback messages from the network are therefore usually so outdated that any action taken by the source in response to such messages is too late to resolve the congestion which caused the messages to be initiated in the first place. Conventional end-to-end congestion control mechanisms are simply incapable of dealing realistically with congestion in today's high speed global networks.

Due to the stochastic nature of the packet arrival process, for transitory periods during the connection, the parameters of a source vary from the values determined at the connection setup time. In addition, congestion may arise in the network for brief periods during the course of the connection due to statistical variances in the multiplexing process. It is therefore important not only to regulate the access to the network at the source, but also to regulate traffic flow within the network by buffer management and scheduling functions. These traffic regulation mechanisms enforce the pre-specified classes of service. Since all congestion control procedures used in high speed networks must be available in real time, however, such procedures must be computationally simple.

In order to achieve these goals, the network must regulate the rate of traffic flow from each source into the network. Such rate-based access control mechanisms are preferable over link-by-link flow controls because such access control mechanisms maximize the speed of information transfer over the network. One well-known congestion preventive rate-based control technique is based on the so-called buffered "leaky bucket" scheme. Such leaky bucket schemes restrict the data transmission, on the average, to the allowable rate, but permit some degree of burstiness diverging from the average. Leaky bucket schemes are disclosed in "Congestion Control Through Input Rate Regulation," by M. Sidi, W-Z. Liu, I. Cidon and I. Gopal, *Proceedings of Globecom '89*, pages 49.2.1–49.2.5, Dallas, 1989, "The 'Leaky Bucket' Policing Method in the ATM (Asynchronous Transfer Mode) Network," by G. Niestegge, *International Journal of Digital and Analog Communications Systems*, Vol. 3, pages 187–197, 1990, and "Congestion Control for High Speed Packet Switched Networks," by K. Bala, I. Cidon and K. Sohraby, *Proceedings of Infocom '90*, pages 520–6, San Francisco, 1990. Some of these leaky bucket congestion control schemes involve the marking of packets entering the network to control the procedures used in the network in handling those packets.

In the Bala et al. article, for example, packets leaving a source are marked with one of two different "colors," red and green. Green packets represent traffic that is within the connection's reserved bandwidth, and are guaranteed a prespecified grade of service based on some level of delay and loss probability within the network. The green packets are therefore transmitted at a rate determined at call setup time. Red packets, on the other hand, represent traffic sent over and above the reserved rate and can be viewed as an emergency relief mechanism coming into play during an overload period where the instantaneously offered traffic is above the reserved bandwidth. In other words, the amount of traffic in excess of the allocated bandwidth is marked red and sent into the network, instead of being dropped at the source. Red packets allow a source to exploit any unused network bandwidth in order to improve the efficiency of the statistical multiplexing.

The network nodes operate to store and forward packets. Green and red packets are treated differently, however. The intermediate nodes will discard red packets first at times of congestion, using a low discard threshold. As a result, red packets have a higher loss probability at the intermediate nodes, and, moreover, do not degrade the performance of the green packets to any significant extent.

One leaky bucket mechanism is described in detail in the copending application of the present applicant Ser. No. 07/932,440, filed Aug. 19, 1992, and assigned to applicants' assignee. It is of considerable importance in leaky bucket access control schemes that the red packets do not degrade the performance of the green packets. Moreover, it is also desirable that the red packets make as much use as possible of the available bandwidth on the network. For example, if the amount of red traffic is not controlled, it is possible that the red packets can destructively interfere with each other, resulting in a lower red packet throughput than the network would have otherwise permitted. These problems are of extreme concern in very large national or international networks where traffic is heavy, demand great and the efficiency of the network of paramount importance.

SUMMARY OF THE INVENTION

In accordance with the illustrative embodiment of the present invention, a buffered leaky bucket access control mechanism is provided for access to a packet network using a packet marking scheme. Packets within the reserved bandwidth of the connection are marked with a high ("green") priority marking while packets not within the reserved bandwidth of the connection are marked with a lower ("red") priority marking. More particularly, in accordance with the illustrative embodiment of the present invention, the bandwidth available to the red packets in the leaky bucket access control mechanism is controlled for every connection to prevent saturation of the network with such red packets. Such saturation would cause the red packets to interfere with each other and with the higher priority green packets. Furthermore, in order to improve interaction with higher layer error recovery protocols, a certain amount of hysteresis is built into the packet marking mechanism. That is, it is arranged such that several low priority red packets are transmitted back-to-back instead of continuously alternating between red and green packets.

In accordance with a first embodiment of the present invention, a spacer is also used to introduce some spacing between packets and achieve some level of smoothing. At the same time, a red traffic limiter limits the number of red packets which can be transmitted during a given time interval. Meanwhile, a hysteresis counter insures that, once red packet marking is initiated, that such red packet marking continues for a fixed number of data units to form a continuous red packet train. Green packets are, of course, transmitted when enough green tokens are present in a fixed-size green token pool into which green tokens are introduced at a fixed rate. The red traffic limiter prevents the network links from being saturated with red packets while the hysteresis counter avoids too frequent alterations of red and green marking periods.

In accordance with a second embodiment of the present invention, the hysteresis mechanism is made dynamic by substituting a variable number of successive red data units for the fixed number in the first embodiment. The number of such successive red data units, moreover, is dependent on the distribution of the incoming packets. This avoids certain problems that might arise in the first embodiment. For example, if the number of successive red data units is too short, there will not be a sufficient accumulation of green tokens to permit a green packet to be transmitted between bursts of red packets. On the other hand, if the number of successive red data units is too large, the loss probability of the red packets at the intermediate nodes increases.

Another problem can arise with a fixed amount of hysteresis. If the number is large enough to permit adequate green token accumulation and thereby permit adequate separation of red packet bursts, it is possible that the red marking interval will continue after the green token pool is full. In accordance with the second embodiment of the invention, the red marking process is turned off when the number of green tokens has reached a threshold (the green resume threshold) to insure that green packets can be transmitted when the green token pool reaches the threshold. Both embodiments of the present invention have the advantage of optimizing the use of red packets by assembling trains of such red packets while, at the same time, limiting the total number of such red packets in any given period of time.

BRIEF DESCRIPTION OF THE DRAWINGS

A complete understanding of the present invention may be gained by considering the following detailed description in conjunction with the accompanying drawings, in which.

To facilitate reader understanding, identical reference numerals are used to designate elements common to the figures.

DETAILED DESCRIPTION

Figure 1:
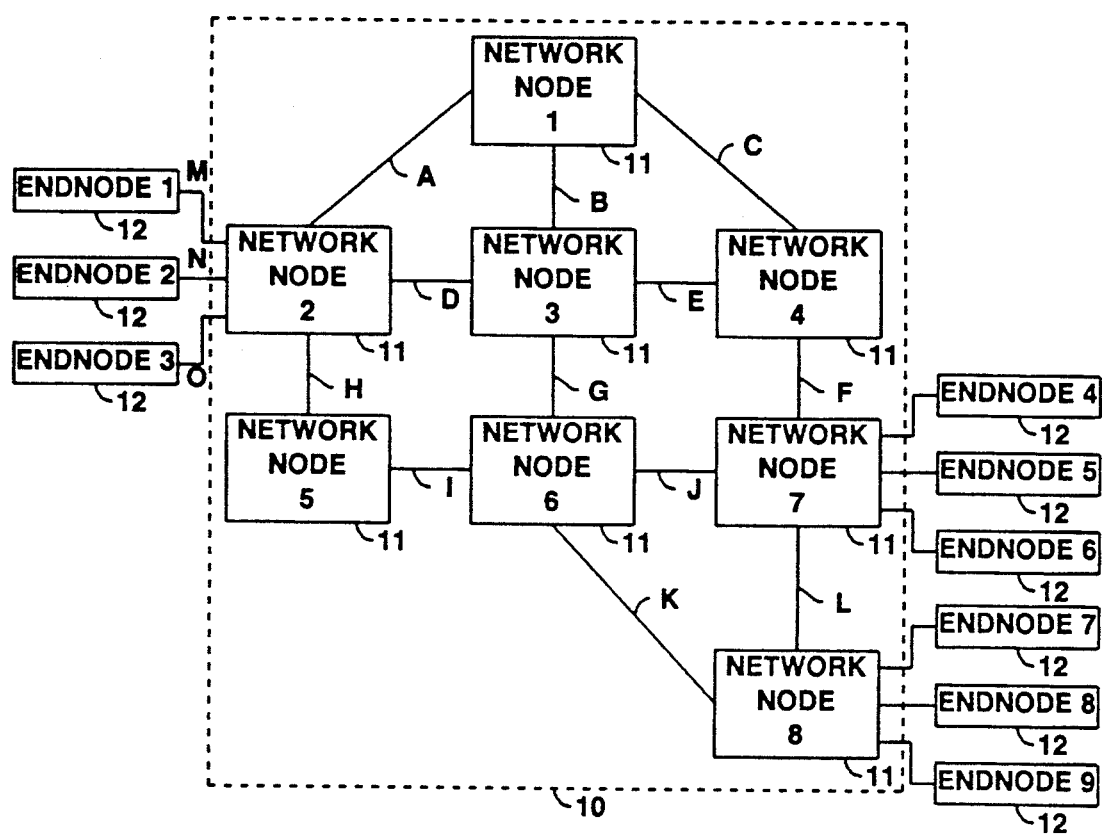
FIG. 1 shows a general block diagram of a packet communications system in which the buffered leaky bucket mechanisms in accordance with the present invention might find use.

Referring more particularly to FIG. 1, there is shown a general block diagram of a packet transmission system 10 comprising eight network nodes 11 numbered 1 through 8. Each of network nodes 11 is linked to others of the network nodes 11 by one or more communication links A through L. Each such communication link may be either a permanent connection or a selectively enabled (dial-up) connection. Any or all of network nodes 11 may be attached to end nodes, network node 2 being shown as attached to end nodes 1, 2 and 3, network node 7 being shown as attached to end nodes 4, 5 and 6, and network node 8 being shown as attached to end nodes 7, 8 and 9. Network nodes 11 each comprise a data processing system which provides data communications services to all connected nodes, network nodes and end nodes, as well as decision points within the node. The network nodes 11 each comprise one or more decision points within the node, at which incoming data packets are selectively routed on one or more of the outgoing communication links terminated within that node or at another node. Such routing decisions are made in response to information in the header of the data packet. The network node also provides ancillary services such as the calculation of routes or paths between terminal nodes, providing access control to packets entering the network at that node, and providing directory services and maintenance of network topology data bases used to support route calculations and packet buffering.

Each of end nodes 12 comprises either a source of digital data to be transmitted to another end node, a utilization device for consuming digital data received from another end node, or both. Users of the packet communications network 10 of FIG. 1 utilize an end node device 12 connected to the local network node 11 for access to the packet network 10. The local network node 11 translates the user's data into packets formatted appropriately for transmission on the packet network of FIG. 1 and generates the header which is used to route the packets through the network 10.

In order to transmit packets on the network of FIG. 1, it is necessary to calculate a feasible path or route through the network from the source node to the destination node for the transmission of such packets. To avoid overload on any of the links on this route, the route is calculated in accordance with an algorithm that insures that adequate bandwidth is available for the new connection, using statistical multiplexing techniques. That is, given the statistical properties of each data source, a plurality of signals from such sources are multiplexed on the transmission links A-L, reserving sufficient bandwidth to carry each signal if that signal stays within its statistically described properties. One such algorithm is disclosed in the copending application, Ser. No. 07/874,917, filed, Apr. 28, 1992, and assigned to applicants' assignee. Once such a route is calculated, a connection request message is launched on the network, following the computed route and updating the bandwidth occupancy of each link along the route to reflect the new connection.

Figure 2:
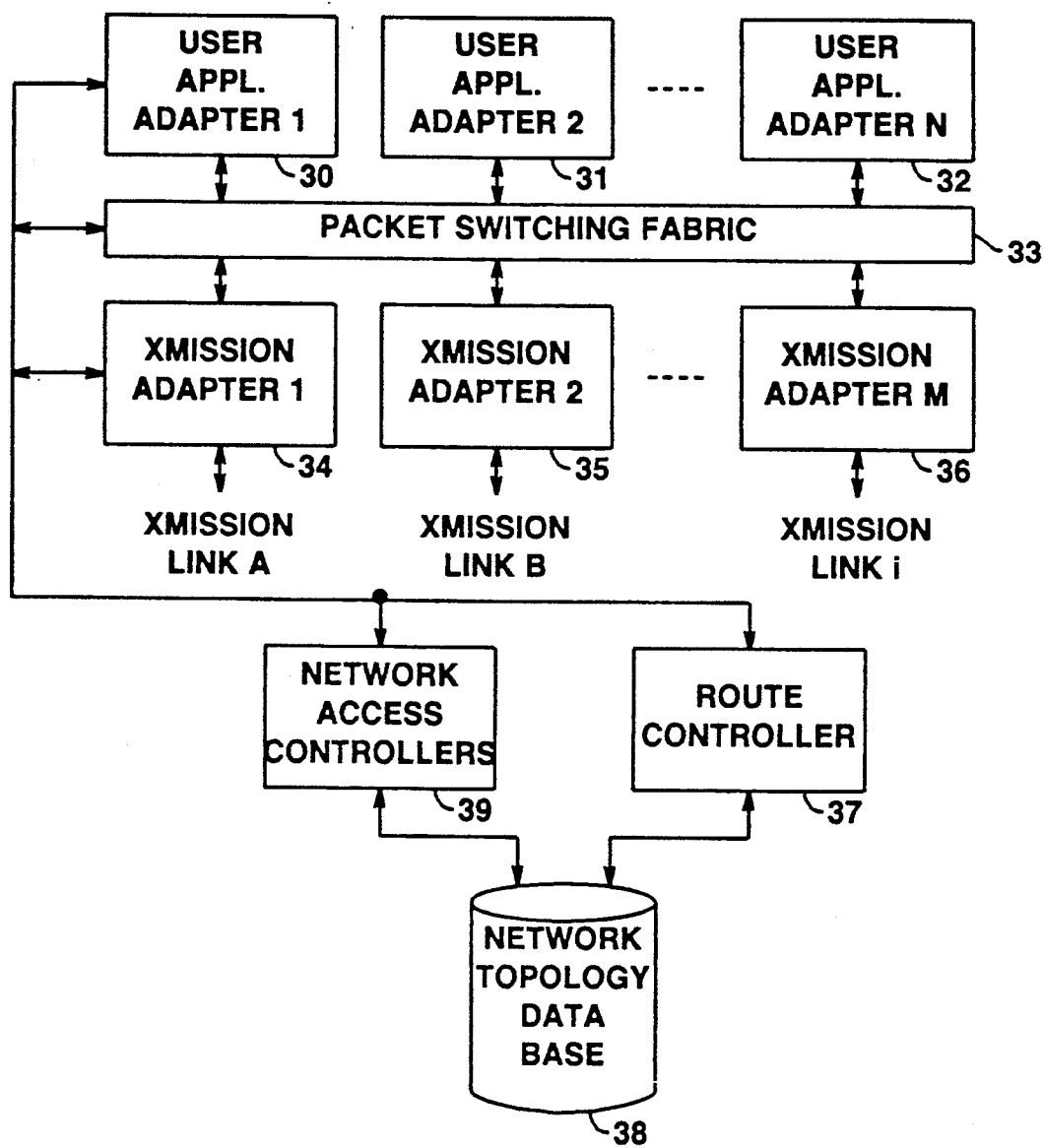
FIG. 2 shows a more detailed block diagram of typical decision point in the network of FIG. 1 at which packets enter the network or are forwarded along the route to a destination for that packet, and at which a leaky bucket mechanism in accordance with the present invention would be located.

In FIG. 2 there is shown a general block diagram of a typical packet network decision point such as is found in the network nodes 11 of FIG. 1. The decision point of FIG. 2 comprises a high speed packet switching fabric 33 onto which packets arriving at the decision point are entered. Such packets arrive over transmission links via transmission adapters 34, 35, ..., 36, or originate in user applications in end nodes via application adapters 30, 31, ..., 32. It should be noted that one or more of the transmission adapters 34-36 can be connected to intranode transmission links connected to yet other packet switching fabrics similar to fabric 33, thereby expanding the switching capacity of the node. The decision point of FIG. 2 thus serves to connect the packets arriving at the decision point to a local user (for end nodes) or to a transmission link leaving the decision point (for network nodes and end nodes). The adapters 30-32 and 34-36 may include queuing circuits for queuing packets prior to or subsequent to switching on fabric 33. A route controller 37 is used to calculate optimum routes through the network for packets originating at one of the user application adapters 30-32 in the decision point of FIG. 2. Network access controllers 39, one for each connection originating at the decision point of FIG. 2, are used to regulate the launching of packets onto the network so as to prevent congestion. That is, if the transient rate of any connection exceeds the statistical values assumed in making the original connection, the controllers 39 slow down the input to the network so as to prevent congestion. Both route controller 37 and access controllers 39 utilize the statistical description of the new connection in calculating routes or controlling access. These descriptions are stored in topology data base 38. Indeed, network topology data base 38 contains information about all of the nodes and transmission links of the network of FIG. 1 which information is necessary for controller 37 to operate properly.

The controllers 37 and 39 of FIG. 2 may comprise discrete digital circuitry or may preferably comprise properly programmed digital computer circuits. Such a programmed computer can be used to generate headers for packets originating at user applications in the decision point of FIG. 2 or connected directly thereto. Similarly, the computer can also be used to calculate feasible routes for new connections and to calculate the necessary controls to regulate access to the network in order to prevent congestion. The information in data base 38 is updated when each new link is activated, new nodes are added to the network, when links or nodes are dropped from the network or when link loads change due to the addition of new connections. Such information originates at the network node to which the resources are attached and is exchanged with all other nodes to assure up-to-date topological information needed for route and access control calculations. Such data can be carried throughout the network on packets very similar to the information packets exchanged between end users of the network.

The incoming transmission links to the packet decision point of FIG. 2 may comprise links from local end nodes such as end nodes 12 of FIG. 1, or links from adjacent network nodes 11 of FIG. 1. In any case, the decision point of FIG. 2 operates in the same fashion to receive each data packet and forward it on to another local or remote decision point as dictated by the information in the packet header. The packet network of FIG. 1 thus operates to enable communication between any two end nodes of FIG. 1 without dedicating any transmission or node facilities to that communication path except for the duration of a single packet. In this way, the utilization of the communication facilities of the packet network is optimized to carry significantly more traffic than would be possible with dedicated transmission links for each communication path.

Figure 3:
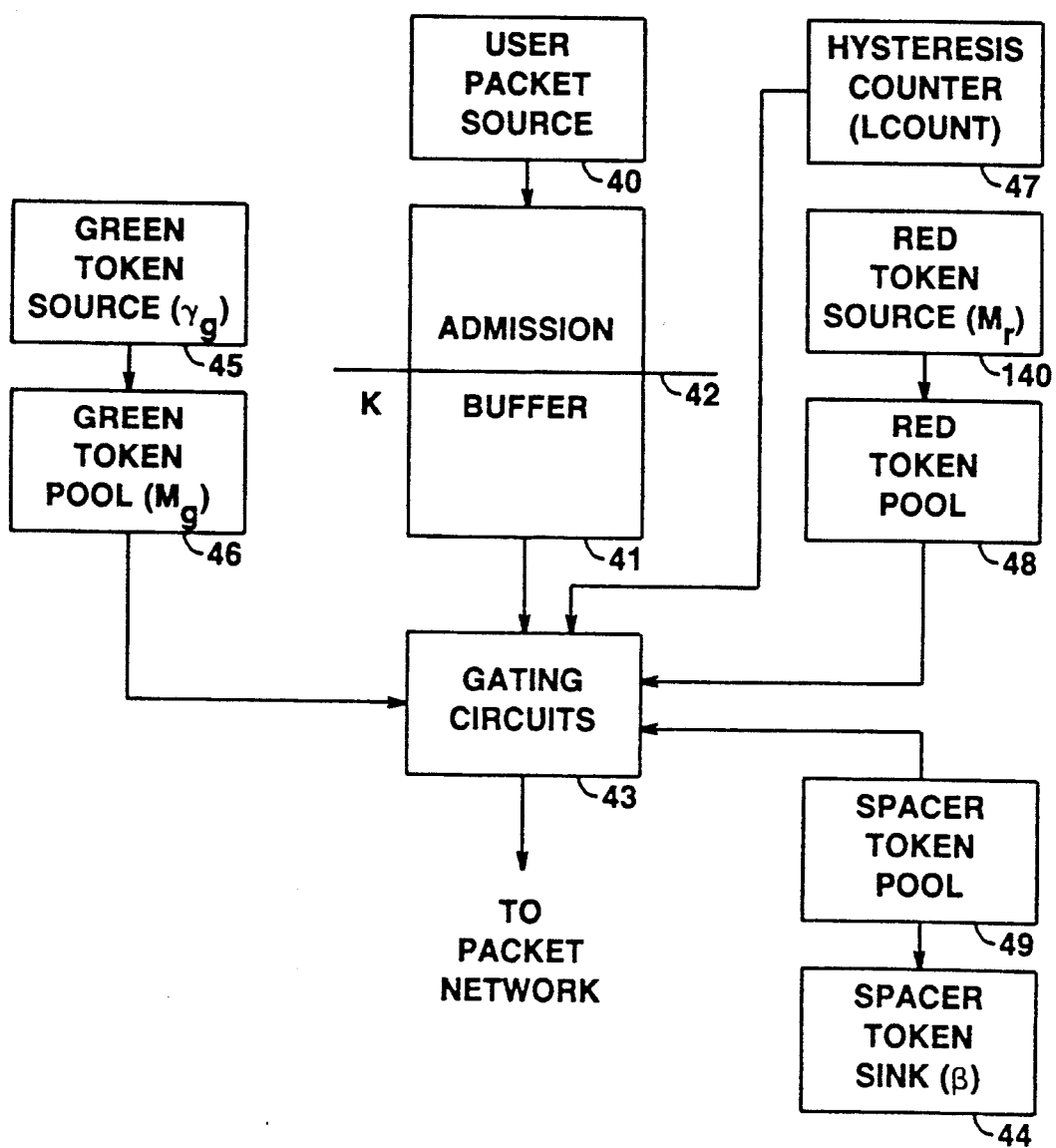
FIG. 3 shows a general block diagram of a buffered leaky bucket access mechanism in accordance with the present invention using a fixed value of hysteresis in the red packet marking process, to be used in the network access controller of FIG. 2.

Referring more particularly to FIG. 3, there is shown a general block diagram of the major components of an access control module in accordance with the present invention which may comprise special purpose circuitry, but preferably is embodied in a programmed computer. The access control module of FIG. 3 comprises a user packet source 40 which generates packets of data having a given set of statistical characteristics. These packets are entered into an admission buffer 41 having a length marker 42 which is used to initiate red marking when insufficient green tokens are available. Packets at the head (bottom) of admission buffer 41 leave buffer 41 through gating circuits 43 under the control of green token pool 46, hysteresis counter 47, red token pool 48 and spacer token pool 49. More particularly, the access control circuit of FIG. 3 operates to launch packets into the packet network with green tags so long as the source 40 remains within the statistical parameters originally assigned to source 40, and transmits packets with red tags whenever the source 40 exceeds the originally assigned statistical parameters. To this end, green bucket 46 is loaded with green tokens at a fixed rate from green token source 45 until the green token pool is full. As an added protection, spacer token pool 49 is loaded with a number of spacer tokens proportional to the length of the packet just launched. Spacer tokens are removed from spacer token pool 49 by spacer token sink 44 at a fixed rate (p). Only when spacer token pool 49 is empty is the next packet allowed to be launched into the packet network, thereby adding a certain level of smoothing of the packet transmission process. When red marking is initiated, hysteresis counter 47 insures that a fixed number of data units are marked as red packets to form a continuous train of red packets in order to better interact with higher layer error recovery protocols. Red token source 140 loads $M_r$ red tokens into red token pool 48 every T period. The limited token count in red token pool 48 limits the number of red data units transmitted during a given time interval to the preselected value $M_r$, thereby insuring that the red traffic does not saturate the transmission links of the network.

The various parameters used and identified in FIG. 3 can be defined as follows:

T:The time interval after which the red token pool is refreshed.

$\gamma_g$:The green token generation rate.

$M_g$:The size of the green token pool. $M_g$ depends upon the burstiness of the traffic from source 40 and is typically chosen to achieve transparency of the leaky bucket to the user traffic. In general, a large $M_g$ will let more packets enter the network as they arrive (limited only by the rate allowed by the spacer). For a given input traffic, the output green traffic will be smoother as $M_g$ becomes smaller. A small $M_g$, however, will introduce larger admission delays, or cause a larger number of packets to be marked red. $M_g$ must always be large enough to hold sufficient tokens to permit the transmission of the maximum sized packet. $M_g$ is chosen heuristically to best satisfy these contending requirements.

The rate of emptying the spacer packet pool. $\beta$ determines the peak rate that the packets may enter the network, and thus affects the smoothness of the packet launching process. If $\beta$ is equal to the peak input rate, the user packets from source 40 will only be queued in admission buffer 41 if no transmission tokens (red or green) are available. However, in order to protect the network, $\beta$ may be chosen to be no higher than the slowest link speed in the packet path. $\beta$ can be further reduced beyond this level, however, to achieve any desired level of smoothing and reserved bandwidth.

$M_r$:The total number of red tokens available in time interval T. $M_r$ therefore forms the upper bound on the amount of the user traffic which is marked red when launched on the packet network during the time interval T.

K:The threshold 42 in admission buffer 41 used to initiate red marking when insufficient green tokens are available.

L:The number of tokens which determines the total number of data units that are marked red once red marking is initiated.

Figure 4:
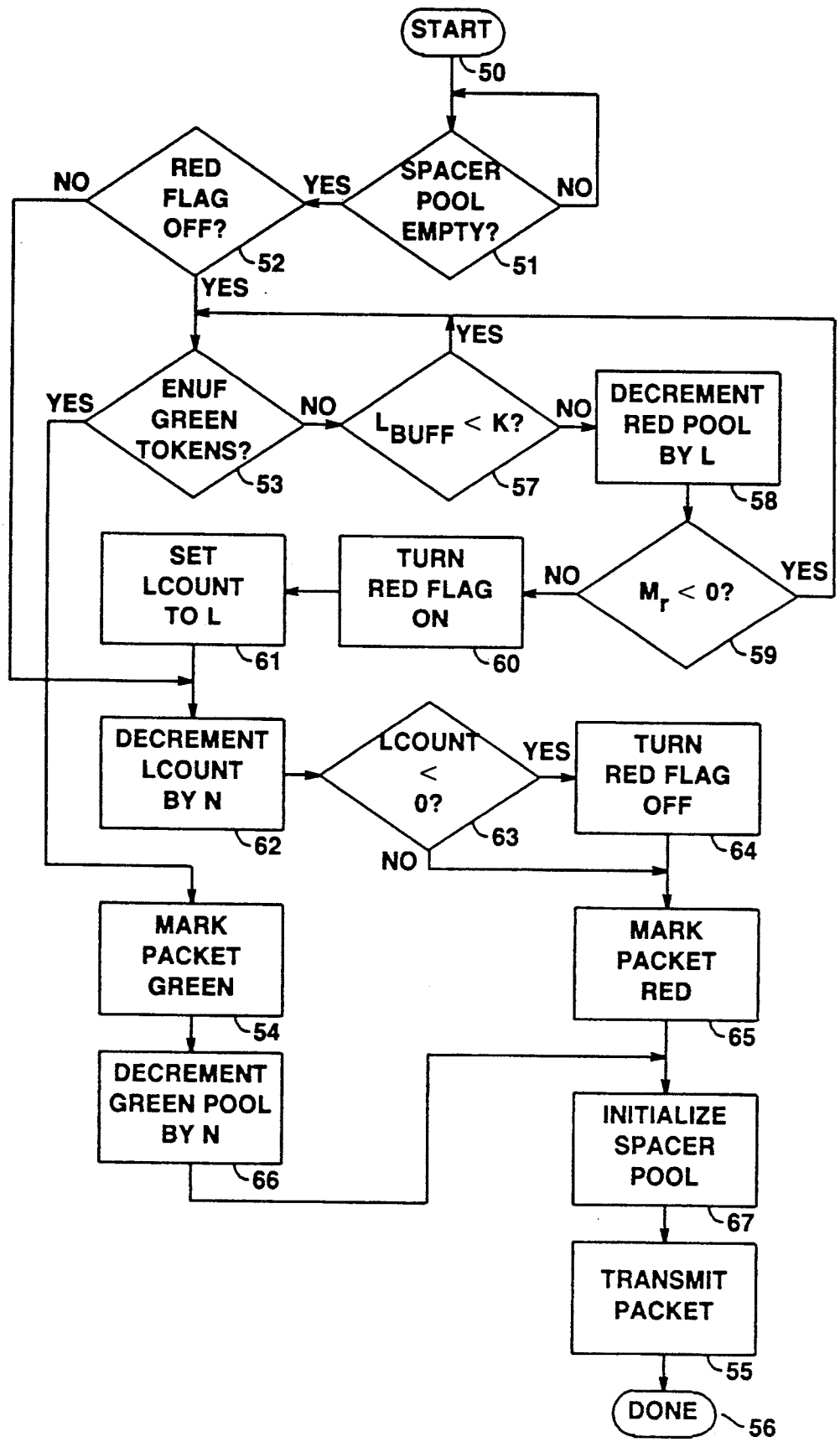
FIG. 4 shows a flow chart of the operation of the leaky bucket access control mechanism of FIG. 3.

Using the definitions given above and the components shown in FIG. 3, the operation of the access control procedure with fixed hysteresis is shown in the flow chart of FIG. 4. In FIG. 4, the leaky bucket access control mechanism with static hysteresis is initiated, starting at start box 50, whenever a user packet reaches the head (bottom) of admission buffer 42. At that time, decision box 51 is entered to determine if the spacer pool 49 is empty. If not, decision box 51 is repeatedly re-entered until the spacer pool 49 is empty. At that time, decision box 52 is entered where it is determined if the red marking flag is off. If so, decision box 53 is entered where it is determined whether enough green tokens have been accumulated in green token pool 46 to accommodate the packet at the head of admission buffer 41. If enough green tokens have been accumulated in green pool 46, box 54 is entered where the packet is marked green and, in box 66, the green pool 46 is updated by subtracting the number N of tokens from the green pool 46 necessary to account for the data units in the green packet. Box 55 is then entered where the green packet is transmitted on the network and the process terminated for that packet in terminal box 56. Start box 50 is re-entered when the next packet arrives at the head of admission buffer 41.

If it is determined in decision box 53 that a sufficient number of green tokens are not available in green pool 46 to accommodate this packet, decision box 57 is entered to determine if the buffer 41 length is less than K, the red marking threshold. If the length of buffer 41 is less than the threshold K, decision box 53 is re-entered to wait for either enough green tokens to be accumulated to accommodate the packet (decision box 53) or the length of the buffer 41 to exceed threshold K (decision box 57). If enough green tokens are accumulated to accommodate the packet before the buffer threshold length K is reached, box 54 is entered to mark the packet green, update the green pool 46 (box 66) and transmit the green packet (box 55). If, however, the buffer length threshold K is reached before enough green tokens are accumulated, box 58 is entered to subtract a fixed hysteresis value L from the red token pool 48. That is, the red token pool is reduced by the number of red tokens needed to transmit the next desired serial train of red packets.

After decrementing the red token pool 48 in box 58, decision box 59 is entered to determine if the red token count $M_r$ has been decremented to below zero. If so, decision box 53 is re-entered to await the accumulation of sufficient green tokens or the refreshing of the red token pool 48. That is, if there are insufficient accumulated red tokens to accommodate the next serial train of red packets, the system recycles to await the accumulation of enough green tokens to mark the packet green or the refreshing of the red token pool.

If the red count $M_r$ is not less than zero, as determined in decision box 59, box 60 is entered to turn the red marking flag on and box 61 entered to preset the count in the hysteresis counter 47 to the fixed value L, representing the number of red tokens necessary to transmit the desired serial sequence of red packets. Box 62 is then entered to reduce the hysteresis count in counter 47 by the value N, representing the number of tokens required to accommodate the current packet at the head of admission buffer 41. In decision box 63, the value of the remaining count in hysteresis counter 47 is compared to zero. If the value in hysteresis counter 47 is less than zero, box 64 is entered to turn the red marking flag off since the tokens in counter 47 are insufficient to accommodate another red packet. Box 65 is then entered to mark the current packet red. If the value in hysteresis counter 47 is not less than zero, box 65 is entered directly, without fuming the red flag off, but marking the current packet red. Box 67 is then entered to re-initialize the spacer pool 49 and then box 55 is entered to transmit the red packet. The process is terminated in terminal box 56 for the current packet. Start box 50 is re-entered when the next packet reaches the head of admission buffer 41.

If it is determined in decision box 52 that the red flag is not off, box 62 is entered to decrement the hysteresis count by N and continue on through boxes 63, 64, 65, 67 and 55 to transmit the next packet as a red packet. The red flag is thus on long enough to exhaust the hysteresis counter 47 (via box 62) and thus transmit the desired train of red packets. Note that the count in hysteresis counter 47 is eventually decremented below zero in box 62 and hence the red packet train is always somewhat longer than the length suggested by the value L.

It can be seen that the procedure outlined in the flow chart of FIG. 4 operates to transmit green packets so long as the arrival of source packets is equal to or less than the green token generation rate in green token source 45. When the arrival rate of source packets exceeds the green token generation rate, there will not be sufficient green tokens to transmit green packets and the red marking flag will be turned on. Once turned on, the red marking flag remains on until the hysteresis count in counter 47 is exhausted, thus insuring a continuous train of red packets of sufficient length to accommodate error recovery protocols. Meanwhile, at the same time that green and red packet marking is taking place, the spacer pool 49 insures a reasonable smoothing to the packet launching process. In addition, the red packet pool 48 limits the number of red data units launched in a fixed period of time. Together, these procedures insure that congestion will not occur in the network due to the launching of excessive numbers of packets from one or more packet sources.

The procedure described in connection with FIGS. 3 and 4 can be summarized as follows. Each packet at the head of the admission buffer 41 is serviced as follows:
1. Each packet waits until the spacer token pool 49 is empty.
2. If there are enough green tokens in the green token pool 46 and if the red marking flag is off, then the packet is marked green and the green token pool 46 is updated.
3. If there are not enough green tokens in green token pool 46 to service the packet and if the admission buffer length is less than K and if red marking is not turned on, then the packet must wait until enough green tokens are accumulated.
4. If there are not enough green tokens in green token pool 46 to service the packet, and if the admission buffer 41 length $>K$ and $M_r \geq L$, then red marking is turned on and the packet is marked red. The hysteresis counter 47 is initialized to L and decremented by the number of tokens needed to accommodate this packet. When the value (LCOUNT) in hysteresis counter 47 = $<0$, then red marking is turned off.
5. If the number of green tokens in green token pool 46 is insufficient to service this packet and the admission buffer 41 length $\geq K$ and $M_r < 0$, then the packet waits until there are enough tokens available to mark the packet one color or the other.

The number of red data units launched in a serial train of packets in FIGS. 3 and 4 is close to and determined by the value L. This number may be too high for some rates of input source packets and may be too low for other rates of input source packets. That is, the lower the input source rate, the more time is available for transmitting red packets and hence the longer the serial red packet train can be. Similarly, the higher the input source rate, the less time is available for transmitting the serial red packet train. On the other hand, the shorter the serial red packet train, the less time available to accumulate green tokens while the red packet train is being transmitted, and sufficient green tokens may not be accumulated to transmit a green packet between bursts of red packets. Moreover, if the number of red packets in the train is too large, the probability of losing red packets at intermediate nodes is larger. These contending requirements for the length of the red packet train can be resolved by making the length of the red packet train vary in response to the rate of arrival of input source packets. A congestion control scheme utilizing such a variable amount of hysteresis is disclosed in FIGS. 5 and 6.

Figure 5:
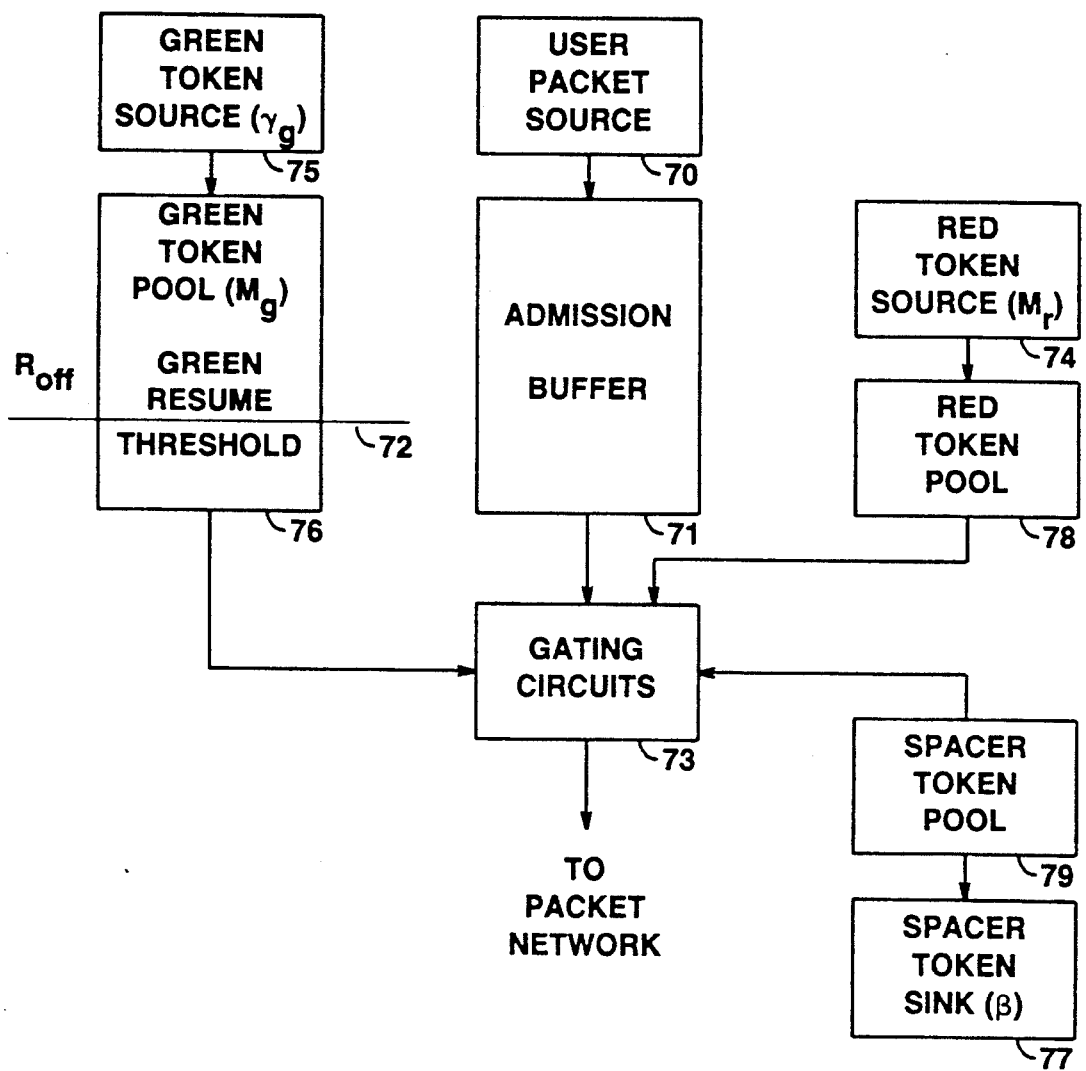
FIG. 5 shows a general block diagram of a buffered leaky bucket access control mechanism in accordance with the present invention using a variable amount of hysteresis in the red packet marking process, to be used in the network access controller of FIG. 2.

Referring more particularly to FIG. 5, there is shown a general block diagram of the major components of another access control module in accordance with the present invention utilizing variable hysteresis in the red packet marking process. As with FIG. 3, FIG. 5 can be realized with special purpose circuitry, but is preferably embodied in a programmed digital computer. The access control module of FIG. 5 comprises a user packet source 70 which generates input packets of data units having a given set of statistical characteristics. These packets are entered into admission buffer 71. Although admission buffer 71 may have a red-initiating threshold K like threshold 42 in buffer 41 in FIG. 3, such a threshold has been omitted in FIG. 71 for simplicity. Green token source 75 feeds a green token pool 76 having a green resume threshold 72 ($R_{off}$) which is used to turn off red marking when the number of green tokens approaches a number sufficient to allow green packet marking. As in the arrangement of FIG. 3, a red token source 74 loads $M_r$ red tokens into red token pool 78 every T period, thus limiting the number of red data units which can be transmitted in the time period T. A spacer pool 79, emptied by spacer token sink 77, insures a minimum space between packets launched into the packet network. The only new parameter in the access control module of FIG. 5 is the green resume threshold $R_{off}$. This parameter can be defined as follows:

$R_{off}$: The green resume threshold $R_{off}$ is a fraction of $M_g$ and provides a dynamic hysteresis between the red and green marking of packets. This is accomplished by turning off red marking if the number of green tokens exceeds a preselected threshold ($R_{off}$) and thus limiting the length of the red packet train in dependence on the number of green tokens available. $R_{off}$, of course, has to be large enough to exceed the number of tokens necessary to transmit a maximum-sized packet.

Figure 6:
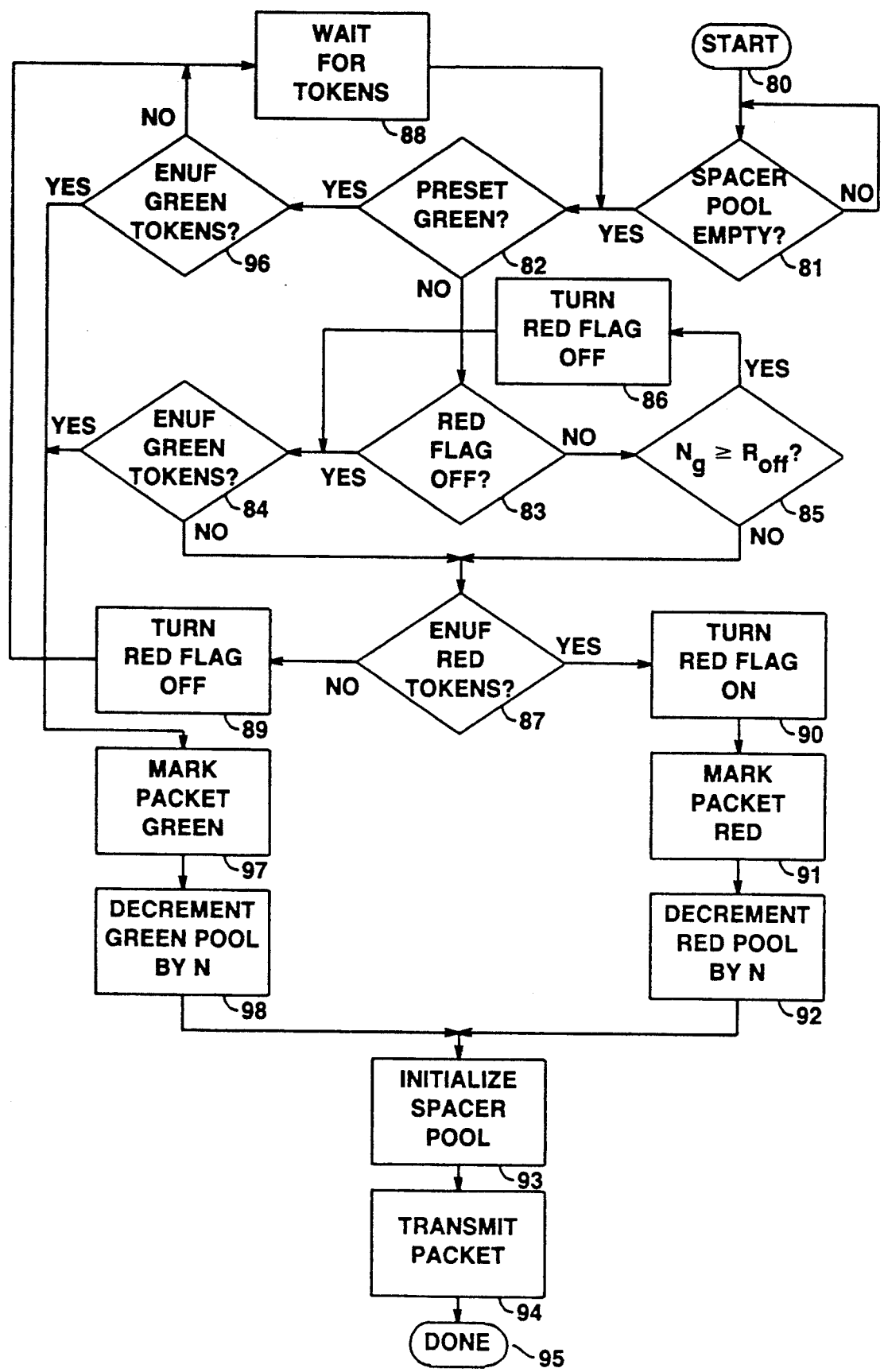
FIG. 6 shows a flow chart of the operation of the leaky bucket access control mechanism of FIG. 5.

Using the definition of $R_{off}$ given above and the definitions of the other parameters given in connection with FIG. 3, the operation of the dynamic hysteresis access control arrangements of FIG. 5 is shown in the flow chart of FIG. 6. In FIG. 6, the dynamic hysteresis access control arrangement of FIG. 5 is started whenever a user packet reaches the head (bottom) of the admission buffer 71. Starting at start box 80, decision box 81 is entered to determine if the spacer pool 79 is empty. If not, decision box 81 is continually re-entered until spacer pool 79 is empty, thus insuring the minimum space between successive packets launched into the network.

When the spacer pool 79 is empty, as determined by decision box 81, decision box 82 is entered to determine if the packet at the head of the admission buffer 71 has been premarked green. This green premarking capability is built into the system of FIGS. 5 and 6 to allow the packet source 70 to mark specified packets as "green" (and hence to be transmitted with guaranteed delay or loss probabilities) regardless of the access control mechanism of FIG. 5. It is possible, of course, to provide the same premarking capability in the access control arrangements of FIGS. 3 and 4. If the packet is premarked green, decision box 96 is entered to determine if sufficient green tokens have been accumulated to transmit the packet. If not, box 88 is entered to await the accumulation of more tokens, and decision box 82 re-entered to check for preset green marking and decision box 96 is re-entered to check for the accumulation of sufficient green tokens. When sufficient green tokens have been accumulated to transmit the preset green packet, box 97 is entered where the packet is marked green and, in box 98, the green token pool 76 is updated by subtracting the number of tokens necessary to accommodate the preset green packet. The spacer pool is reinitialized in box 93 and the packet transmitted onto the packet network in box 94. The process terminates for that packet in terminal box 95.

If the packet at the head of the packet buffer 71 is not preset green, as determined by decision box 82, decision box 83 is entered to determine if the red marking flag is off. If the red marking flag is off, as determined by decision box 83, decision box 84 is entered to determine if sufficient green tokens have been accumulated to accommodate this packet. If so, box 97 is re-entered to mark this packet green, update the green token pool 76 in box 98, reinitialize the spacer pool 79 in box 93, transmit the green packet in box 94 and terminate the process for this packet in terminal box 95.

If the red marking flag is turned on, as determined by decision box 83, decision box 84 is entered to determine whether a sufficient number of green tokens have been accumulated in green token pool 76 to accommodate this packet. If sufficient green tokens are available, as determined by decision box 84, box 97 is entered as described above to mark the packet green (box 97), decrement the green token pool 76 (box 98), initialize the spacer pool 79 (box 93), transmit the packet (box 94) and terminate the process for this packet (box 95). If, on the other hand, sufficient green tokens have not been accumulated to accommodate this packet, as determined by decision box 84, decision box 87 is entered to determine if sufficient red tokens are available to transmit the packet. The procedure which takes place in decision box 87 will be described below.

If the red marking flag is not turned off, as determined by decision box 83, decision box 85 is entered to determine if the number of tokens in green token pool 76 ($N_g$) is equal to or greater than the green resume threshold 72 ($R_{off}$). If the number of green tokens equals or exceeds the green resume threshold 72 ($R_{off}$), box 86 is entered to turn the red marking flag off. Decision box 84 is then entered to determine if sufficient green tokens have been accumulated to accommodate the transmission of this packet. At this time, the answer in decision box 84 should always be "YES" since the number of green tokens is greater than $R_{off}$, as determined in decision box 85. Box 97 is therefore entered to mark this packet green, update the green pool in box 98, initialize the spacer pool in box 98, transmit the packet in box 94 and terminate the process in box 95.

If the number of green tokens in pool 72 is below the green resume threshold 72, as determined by decision box 85, or if sufficient green tokens are not available to transmit this packet, as determined by decision box 84, decision box 87 is entered to determine if sufficient red tokens have been accumulated in red token pool 78 to accommodate this packet. If so, box 90 is entered to turn the red marking flag on, box 91 is entered to mark this packet red, and box 92 is entered to update the red token pool 78 by subtracting the number of tokens necessary to accommodate this packet. Thereafter, box 93 is entered to reinitialize the spacer token pool 79 and box 94 is entered to transmit the red packet. The procedure for this packet then terminates in terminal box 95. Note that the red flag may already be turned on when box 90 is entered, due to previous traversals of the flow chart when processing a previous packet. In that case, the red flag is left on and box 91 is entered as before.

If insufficient red tokens have been accumulated in red token pool 78 to accommodate this packet, as determined by decision box 87, box 89 is entered to turn the red marking flag off. Box 88 is then entered to await the accumulation of more green or red tokens. Decision box 82 is thereafter entered to reinitiate the red-green marking process of FIG. 6, as described above, for It can be seen that the flow chart of FIG. 6 details the procedure for utilizing a variable amount of hysteresis in the red marking process. More particularly, the green resume threshold 72 ($R_{off}$) terminates the red marking process if the packet source process produces packets sufficiently slowly so that the green token pool 76 reaches the green resume threshold 72 by the time the next packet is available at the head of buffer register 71. This allows red marking to be initiated and to continue only until the green resume threshold is reached.

The procedure carried out in the flow chart of FIG. 6 can be summarized as follows:

1. A packet at the head of the input buffer 78 first looks to see if the spacer token pool is empty. If not, it waits in the buffer until the token pool becomes empty.
2. Upon finding (or waiting for) an empty spacer token pool, a packet checks if there are enough green tokens in the green token pool to allow its transmission into the network.
3. In case there are not enough green tokens when the spacer pool is empty, the actions to be taken depend on whether or not the packet at the head of the admission buffer 78 is premarked green.

If the packet is premarked green, the packet waits at the head of the admission buffer 78 until enough green tokens have been generated, thereby possibly holding other unmarked packets waiting behind it in the admission buffer 78.

If the packet is not premarked green, red tokens can be used for its transmission. The red marking is then turned on, if it was not already on, and the packet is sent as red if there are enough red tokens left. After the red marking has been turned on, all the successive unmarked packets are sent marked red until either $R_{off}$ green tokens have been accumulated in the green token pool 76, or not enough red tokens remain to send the next packet, since almost all of the red tokens have already been used to send red packets.

Note that when the spacer token removal rate $\beta$ is equal to the input peak rate, queuing at the admission buffer 78 occurs only because of premarked green packets, or because the red tokens have been exhausted. If admission buffer 71 had a threshold K, as in FIG. 3, packets could also be waiting for this threshold K tO be reached.
4. In order to limit the number of red packets sent into the network, an upper bound $M_r$ is imposed on the maximum number of data units that can be sent as red in any given time interval T. The number of red tokens available is refreshed to its maximum value $M_r$ at the beginning of every period T.

With the above procedure of FIG. 6, at transient periods of long bursts of input packets, blocks of red packets will again be interleaved with blocks of green packets. The threshold $R_{off}$ is made large enough to provide sufficient hysteresis to avoid alternating between green and red packets being launched into the packet network. The parameters $M_r$, T and $\beta$ are chosen so that there is sufficient time separation between the blocks of red packets and that the amount of red packets sent into the network in a short period of time does not significantly increase the loss probability of the red packets at intermediate network nodes.

It should also be clear to those skilled in the art that further embodiments of the present invention may be made by those skilled in the art without departing from the teachings of the present invention.

What is claimed is:

1. A system for a source of user data packets to control access to a packet communications network comprising means for marking each packet launched on said network with a high priority marking when the data packets from said source stay within a predefined range of statistical parameters, means for marking each packet launched on said network with a lower priority marking when the data packets from said source fall outside of said predefined range of statistical parameters, and means for prolonging, once started, the marking of packets launched on said network with said lower priority to produce a serial train of packets with said lower priority marking.

2. The system to control access to a packet communications network according to claim 1 further comprising means for limiting the total number of packets with said lower priority marking for each successive fixed time interval.

3. The system to control access to a packet communications network according to claim 1 further comprising means for maintaining at least a minimum space between successive packets launched on said network regardless of their priority markings.

4. The system to control access to a packet communications network according to claim 1 further comprising a network admission buffer having a low priority marking threshold therein for queuing said user data packets, and means for enabling said low priority marking means when the contents of said admission buffer exceeds said threshold.

5. The system to control access to a packet communications network according to claim 1 further comprising means for generating high and low priority tokens for enabling the marking of any one of said packets when sufficient numbers of one or the other of said priority tokens are available to accommodate the number of data units in said one packet, means for storing said tokens for said high priority marking in a high priority token pool, said high priority token storage means having a high priority resume threshold, and means for terminating low priority marking of said packets when said high priority resume threshold is exceeded.

6. A packet communication network including a system for controlling the access to said network at each access point to said network, said access controlling system comprising means for marking each packet launched on said network at each of said access point to said network with a high priority marking when the data packets at said each access point stay within a predefined range of statistical parameters, means for marking each packet launched on said network with a lower priority marking when the data packets at said corresponding each access point fall outside of said predefined range of statistical parameters, and means for prolonging, once started, the marking of packets launched on said network with said lower priority to produce a serial train of packets with said lower priority marking.

7. The packet communications network according to claim 6 further comprising means for limiting the total number of packets with said lower priority marking for each successive fixed time interval.

8. The packet communications network according to claim 6 further comprising means for maintaining at least a minimum space between successive packets launched on said network regardless of their priority markings.

9. The packet communications network according to claim 6 further comprising a network admission buffer having a low priority marking threshold therein for queuing said user data packets, and means for enabling said low priority marking means when the contents of said admission buffer exceeds said threshold.

10. The packet communications network according to claim 6 further comprising means for generating high and low priority tokens for enabling the marking of any one of said packets when sufficient numbers of one or the other of said priority tokens are available to accommodate the number of data units in said one packet, means for storing said tokens for said high priority marking in a high priority token pool, said high priority token storage means having a high priority resume threshold, and means for terminating low priority marking of said packets when said high priority resume threshold is exceeded.

11. A method controlling the access to a packet communications network at each access point to said network, said method comprising the steps of marking each packet launched on said network at each of said access points to said network with a high priority marking when the data packets at said each access point stay within a predefined range of statistical parameters, marking each packet launched on said network with a lower priority marking when the data packets at said each access point fall outside of said predefined range of statistical parameters, and prolonging, once started, the marking of packets launched on said network with said lower priority to produce a serial train of packets with said lower priority marking.

12. The method according to claim 11 further comprising the step of limiting the total number of packets with said lower priority marking for each successive fixed time interval.

13. The method according to claim 11 further comprising the step of maintaining at least a minimum space between successive packets launched on said network regardless of their priority markings.

14. The method according to claim 11 further comprising the steps of queuing said user data packets in a network admission buffer having a low priority marking threshold therein, and enabling said low priority marking means when the contents of said admission buffer exceeds said threshold.

15. The method according to claim 11 further comprising the steps of generating high and low priority tokens for enabling the marking of any one of said packets when sufficient numbers of one or the other of said priority tokens are available to accommodate the number of data units in said any one packet, storing said tokens for said high priority marking in a high priority token pool, said high priority token pool having a high priority resume threshold, and terminating low priority marking of said packets when said high priority resume threshold is exceeded.

* * * * *

UNITED STATES PATENT AND TRADEMARK OFFICE
CERTIFICATE OF CORRECTION

PATENT NO. : 5,311,513

DATED : May 10, 1994

INVENTOR(S) : Ahmadi et al

It is certified that error appears in the above-identified patent and that said Letters Patent is hereby corrected as shown below:

```
Col. 1, line 50, change "deafing" to --dealing--.
Col. 6, line 65, change "(p)" to --(b)--.
Col. 7, line 30, change the li   to read --B:  The rate of emptying
                 the spacer poLl deter...--.
Col. 8, line 56, change "fuming"' to --turning--.
Col. 9, line 12, change "tumed" to --turned--.
Col. 9, line 43, change "t0" to --to--.
Col. 10, line 20, change "FIG. 71" to --Buffer 71--.
Col. 12, line 13, add after for, --this packet--.
Col. 12, line 46, change "tumed" to --turned--.
Col. 12, line 59, change "t0" to --to--.
Col. 13, line 55, change "f r" to --for--.
```

Signed and Sealed this

First Day of November, 1994

Attest:

BRUCE LEHMAN

Attesting Officer

Commissioner of Patents and Trademarks